United States Patent
Ruffa

(10) Patent No.: US 6,704,247 B1
(45) Date of Patent: Mar. 9, 2004

(54) HIGH EFFICIENCY PARAMETRIC SONAR

(75) Inventor: Anthony A. Ruffa, Hope Valley, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/400,086

(22) Filed: Mar. 24, 2003

(51) Int. Cl.[7] .............................. G01S 15/00; G01S 7/52
(52) U.S. Cl. .......................................... 367/92; 367/137
(58) Field of Search .............................. 367/92, 138, 137

(56) References Cited

U.S. PATENT DOCUMENTS

| | | | | |
|---|---|---|---|---|
| 3,870,988 A | * | 3/1975 | Turner | 367/92 |
| 3,882,444 A | * | 5/1975 | Robertson | 367/92 |
| 3,964,013 A | * | 6/1976 | Konrad | 367/92 |
| 4,320,474 A | * | 3/1982 | Huckabay et al. | 367/138 |
| 4,400,804 A | * | 8/1983 | Konrad | 367/92 |

FOREIGN PATENT DOCUMENTS

WO     WO 94/120865    * 9/1994 ................. 367/92

* cited by examiner

Primary Examiner—Ian J. Lobo
(74) Attorney, Agent, or Firm—James M. Kasischke; Michael F. Oglo; Jean-Paul A. Nasser

(57) ABSTRACT

A parametric sonar for use in a liquid medium includes a first signal generator which transmits a first acoustic signal and a second signal generator transmitting a second acoustic signal which interatct to produce a difference frequency signal at an interference region. A cavitation generator is provided to transmit a cavitation acoustic wave causing cavitation vapor bubbles in the liquid medium at the interference region. The cavitation vapor bubbles improve the efficiency of generating the difference frequency signal.

12 Claims, 1 Drawing Sheet

HIGH EFFICIENCY PARAMETRIC SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a device for increasing the efficiency of parametric sonar. More particularly this device utilizes characteristic effects of a cavitating transducer and alternatively introduce an outside stimulant to enhance the non-linear effects of a transmission medium.

Parametric sonar is well known. FIG. 1 shows a typical parametric sonar 10 positioned in a liquid environment 12. A first transducer 14 and a second transducer 16 are provided in acoustic communication with the environment 12. First and second transducers 14, 16 are joined with amplifiers 18 and 20, respectively. Amplifier 18 is joined to a first oscillator 22, and amplifier 20 is joined to a second oscillator 24. The oscillators 22, 24 are joined to a controller 26. In use, controller 26 activates first and second oscillators 22, 24 which provide a signal to the associated amplifier 18, 20 and then to the associated first transducer 14 and second transducer 16. The signal provided to first transducer 14 is at a first frequency, $F_1$. This results in a first acoustic wave 28 at this frequency. The second transducer 16 receives a signal at a second frequency, $F_2$, resulting in a second acoustic wave 30 at this frequency. Transducers 14 and 16 are oriented so that transmitted acoustic waves 28 and 30 overlap in an overlap region 32. In overlap region 32, an additive acoustic wave (not shown) having frequency, $F_1+F_2$, and a difference acoustic wave 34 having frequency, $F_1-F_2$, is created. Frequencies $F_1$ and $F_2$ are chosen so that the additive acoustic wave frequency dissipates over a short range while the difference acoustic wave 34 is transmitted at the desired range. Production of the difference acoustic wave 34 is very inefficient. Transducers 14 and 16 need to transmit a large amount of power in order to create a difference acoustic wave 34 having the desired power.

(2) Description of the Prior Art

The current art of parametric sonar takes advantage of the non-linearity associated with a transmission medium. It involves a generation of two frequencies, $F_1$ and $F_2$, which interact to form sum and difference frequency components. In a water medium, the sum frequency components (and the $F_1$ and $F_2$ components) quickly attenuate leaving only the difference frequency components. The main advantage of parametric sonar is that the beam width is based on $F_1$ and $F_2$ (not the difference frequency $F_1-F_2$), so that very narrow beams can be generated at low frequencies (even with a small aperture). One of the main disadvantages of parametric sonar in water is that the efficiency is very low, leading to a reduction in source level that can typically be 30 dB or more.

The following patents, for example, disclose parametric sonar devices utilized underwater:

U.S. Pat. No. 3,870,988 to Turner;
U.S. Pat. No. 3,882,444 to Robertson; and
U.S. Pat. No. 3,964,013 to Konrad.

Specifically, Turner discloses an underwater detection and identification method and apparatus utilizing the principle of parametric cross-modulation of ultrasonic frequencies within a non-linear propagation medium for obtaining an acoustical signature of an object under observation. The object is illuminated by ultrasound of suitable, high frequency projected from the observation platform and echo signals are received composed of side bands generated by combining the illuminating frequency with the relatively low signature frequency. The received ultrasonic side band frequency signals are then processed electronically to yield a signal representative of a characteristic of the object. The apparatus is essentially a hybrid, active-passive sonar operating in a continuous uninterrupted mode.

The patent to Robertson discloses a system for detecting and isolating incoming acoustic waves. The system includes means for transmitting a random noise signal that will intersect the incoming waves. Cross modulation products, particularly the first order sum and difference frequencies, occurring in the volume where the incoming low frequency and transmitted high frequency signals meet and intersect are propagated back toward a receiver where the modulated noise signals are correlated with the transmitted noise signal to isolate the lower frequency incoming signal. The interaction between the transmitted and incoming signals takes place at a plurality of volumetric segments which are located at various distances from the transmitter. By correlating the modulated return signals, which are received at selected intervals, with properly delayed replicas of the transmitted signal, the interaction, or cross modulation products, at any selected range can be isolated in the receiver. By summing these isolated signals, the incoming frequency can be detected, the overall system acting as a virtual receiving array.

Konrad discloses a cavitating parametric underwater acoustic source for generating acoustic energy at low and medium frequencies. The source comprises a plurality of electro-acoustic transducer elements which are electrically energized in a liquid medium such as water at two or more primary frequencies. Changes in the ambient liquid pressure at or adjacent the transducer cause cavitation in the liquid medium which produces a high degree of non-linearity resulting in the generation of sum and difference frequencies of the primary frequencies in the, liquid. The difference frequency is used to transmit acoustic energy in the liquid medium.

It should be noted that Konrad '013 uses the same transducers to provide cavitation bubbles that are used to create the difference acoustic wave. Use of a transducer to create the large amplitude acoustic waves that are needed for cavitation can damage the transducer. Furthermore, control of low amplitude transducers is more precise for signal transmission.

SUMMARY OF THE INVENTION

Therefore it is an object of this invention to provide parametric sonar having increased efficiency in the transmission medium.

Another object of this invention is to provide parametric sonar having increased efficiency in the transmission medium by utilizing cavitation bubbles to increase the non-linearity of the transmission medium.

Still another object of this invention is to provide cavitation bubbles in a transmission medium in response to driving transducers at a power sufficient to generate the cavitation bubbles.

Yet another object of this invention is to provide parametric sonar having independently introduced bubbles in the transmission medium at a location of the projecting transducers to increase the non-linearity of the transmission medium.

In accordance with one aspect of this invention, there is provided a parametric sonar source operating in a fluid transmission medium. An improvement is provided for selectively increasing the efficiency of signals generated by transducers of the parametric source. This improvement includes an acoustic cavitation wave generated to intersect the acoustic waves emitted by the transducers of the parametric source. Interaction of the frequencies $F_1$ and $F_2$ of the acoustic transducer waves with the acoustic cavitation wave will generate subharmonics having a greater amplitude than in an absence of the acoustic cavitation wave. Preferably, the acoustic cavitation wave is introduced at a right angle or transverse to the acoustic waves emitted by the transducers of the parametric source, thereby providing an enhanced parametric sonar device.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
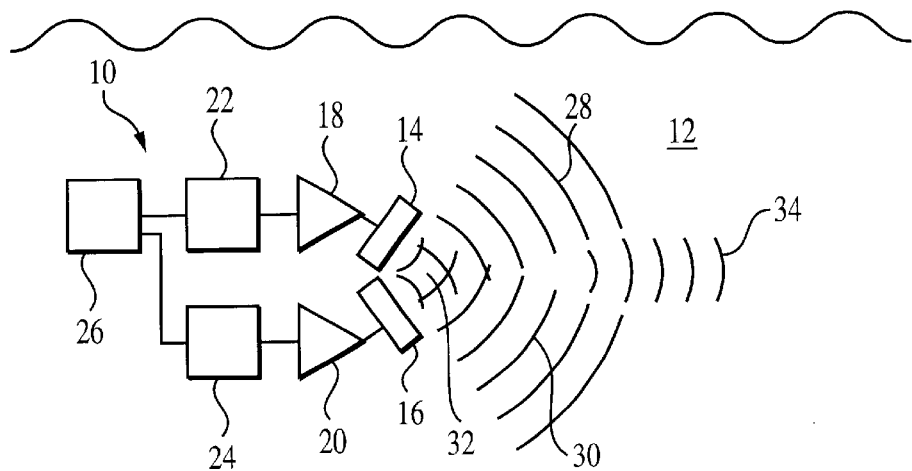
FIG. 1 is a schematic view of a parametric sonar according to the Prior Art.
Figure 2:
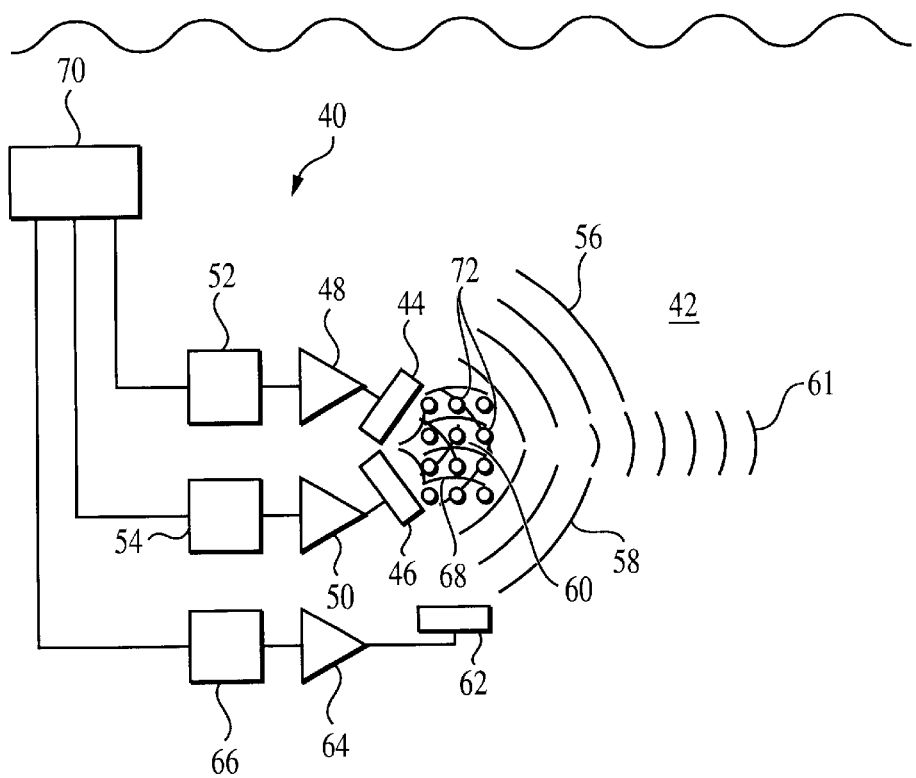
FIG. 2 is a schematic view of a parametric sonar assembly according to a preferred embodiment of the present invention.

In general, the present invention is directed to the purpose of increasing the efficiency of parametric sonar, and has by way of explanation the embodiment shown in FIG. 2.

It has been found by the inventor that an increased efficiency of parametric sonar from a system generally indicated at element 40 will depend upon the degree of non-linearity in the transmission medium 42. In a fluid, the degree of non-linearity is described by the Navier-Stokes equations and the equation of state. When two finite-amplitude acoustic signals $F_1$ and $F_2$ are generated (having differing frequencies), both subharmonics and superharmonics are also generated with amplitudes that depend on the magnitude of the nonlinear terms in the Navier-Stokes equation and the equation of state (compared to the magnitude of the linear terms).

In FIG. 2, there is shown a first embodiment of the invention. This provides an enhanced parametric sonar set up 40 positioned in a liquid environment 42. In this embodiment first and second signal transducers 44 and 46 are provided in communication with the liquid environment 42. First transducer 44 is joined to a first amplifier 48, and second transducer 46 is joined to a second amplifier 50. Amplifiers 48, 50 are joined to first and second oscillators 52, 54. First oscillator 52 is capable of generating a signal at a first frequency, $F_1$. Second oscillator 54 is capable of generating a signal at a second frequency, $F_2$. Transducers 44 and 46 are oriented so that transmitted acoustic waves 56 and 58 overlap in an overlap region 60.

As is known in the art, frequencies $F_1$ and $F_2$ are chosen so that the additive acoustic wave frequency dissipates over a short range while the difference acoustic wave 61 is transmitted at the desired range. A cavitation transducer 62 is joined to a cavitation amplifier 64 which, in turn, is joined to a cavitation oscillator 66. Cavitation oscillator 66 and cavitation transducer 62 are preferably designed to transmit a cavitation acoustic wave 68 at a frequency of 1–2 MHz at a sufficient power level to cause cavitation of the liquid medium. Other cavitation frequencies can be used dependent on the signal transducer frequencies, $F_1$ and $F_2$; the size of the cavitation region needed; and the available power. Preferably, cavitation transducer 62 is oriented at a right angle to the plane of the overlap region 60. All of the oscillators 52, 54 and 66 are joined to a common controller 70.

In operation, controller 70 activates cavitation oscillator 66. Pressure troughs in the cavitation acoustic wave 68 cause vaporization of the liquid medium 42 resulting in cavitation bubbles 72. Controller 70 activates oscillators 52 and 54 when cavitation bubbles 72 have been formed in the overlap region 60. Transducers 44 and 46 transmit acoustic waves 56 and 58. Acoustic waves 56 and 58 overlap in overlap region 60 which has been filled with cavitation bubbles 72. Interference between waves 56 and 58 produces difference acoustic wave 61. In the case of active sonar transmission, controller 70 then inactivates oscillators 52, 54 and 66 and their associated transducers 44, 46 and 66. In absence of the cavitation acoustic wave 68, cavitation bubbles 72 dissipate. Transducers 44, 46 wait to receive an echo from a target object (not shown). Alternatively, an additional transducer (not shown) can be provided to receive the echo.

Accordingly, the degree of non-linearity of the transmission medium 42 is increased significantly by the introduction of cavitation bubbles into the transmission medium 42 in the path of the generated signals 56, 58. This leads to a more efficient generation of subharmonics and thus an increased source level.

This arrangement has the advantage of allowing more control over the transmitted waveforms, since the transducers do not also have to create a cavitation field. The independent cavitation bubbles are preferably vapor bubbles (due to cavitation) instead of air bubbles. Vapor bubbles have the advantage of returning to the liquid state when the acoustic field is turned off, so that they are not present during operation of any receive array.

The primary advantage of the arrangement shown in FIG. 2 is the much greater source levels than otherwise possible. This is due to the greater amplitude associated with subharmonics due to the cavitation bubbles. There is some disadvantage in that some of the acoustic energy will be lost due to scattering of the bubbles; however, the increased amplitudes at the subharmonic frequencies should more than compensate for this loss. Also, most of the energy loss due to scattering will be at the primary frequencies $F_1$ and $F_2$ (due to bubble resonance at these frequencies), not at the desired frequency $F_1$–$F_2$.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A parametric sonar for use in a liquid medium comprising:

a first signal generator to transmit a first acoustic signal having a first frequency;

a second signal generator to transmit a second acoustic signal having a second frequency;

a cavitation generator to transmit a cavitation acoustic wave to cause cavitation of the liquid medium in a cavitation region, said second signal generator being oriented to transmit said second acoustic signal such that said second acoustic signal interferes with said first acoustic signal to produce a difference frequency signal and an additive frequency signal in said cavitation region.

2. The device of claim 1 wherein said cavitation generator is oriented to produce the cavitation acoustic wave at a right angle to the produced difference frequency signal.

3. The device of claim 1 wherein said cavitation acoustic wave has a frequency of 1–2 MHz.

4. The device of claim 1 further comprising a controller joined to said first signal generator, said second signal generator and said cavitation generator.

5. The device of claim 4 wherein each of said first signal generator, second signal generator and cavitation generator comprise:

an associated oscillator joined to said controller to provide an electronic signal;

an associated amplifier joined to said oscillator to provide an amplified electronic signal; and an associated transducer joined to said associated amplifier to convert said amplified electronic signal into an associated acoustic signal.

6. The device of claim 4 wherein said controller acts to activate and deactivate said first signal generator, said second generator and said cavitation generator.

7. The device of claim 4 wherein:

said controller acts to activate and deactivate said cavitation generator; and said controller can change the mode of at least one of said first signal generator and said second signal generator from a signal transmitting mode while said cavitation generator is activated to a signal receiving mode while said cavitation signal generator is deactivated.

8. The device of claim 1 wherein said difference frequency signal has a frequency allowing transmission through the liquid medium greater than 10 meters.

9. The device of claim 8 wherein said additive frequency has a frequency which substantially dissipates in the liquid medium at a range less than 5 meters.

10. A high efficiency paramatric sonar system for use in a liquid medium comprising:

a parametric sonar system generating an additive frequency acoustic signal and a difference frequency acoustic signal at an overlap region in the liquid medium; and a cavitation generator generating a cavitation acoustic signal to cause cavitation bubbles to form in the overlap region.

11. The device of claim 10 wherein said cavitation generator is oriented to produce the cavitation acoustic signal at a right angle to the difference frequency acoustic signal.

12. The device of claim 10 wherein said cavitation acoustic signal has a frequency of 1–2 MHz.

* * * * *